W. L. BODMAN.
WHEEL JOURNAL.
APPLICATION FILED JUNE 7, 1909.
975,744.
Patented Nov. 15, 1910.
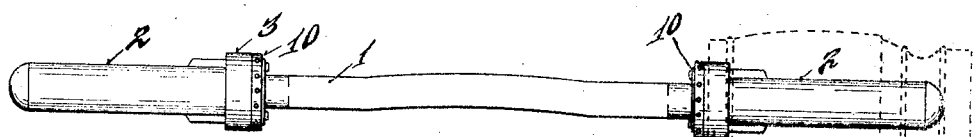
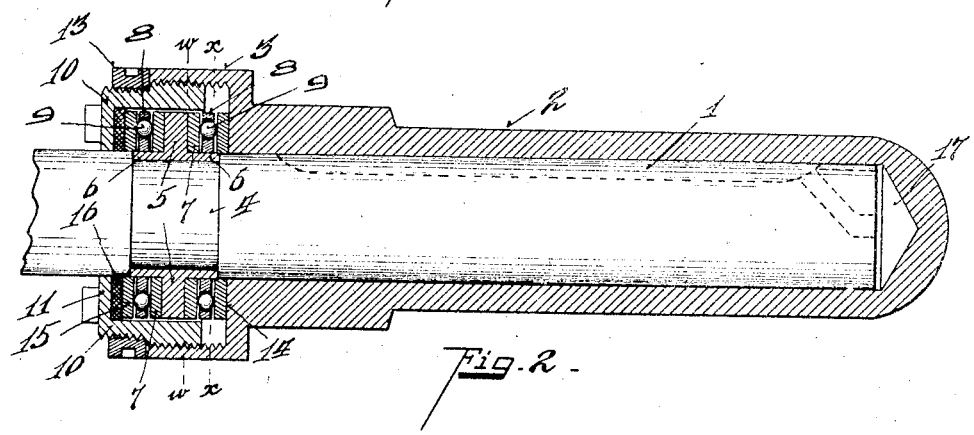
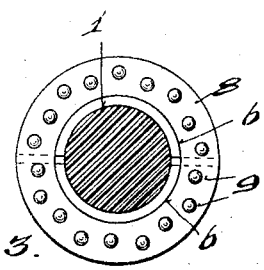
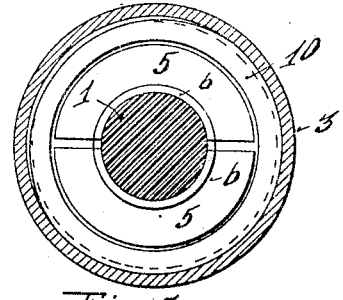
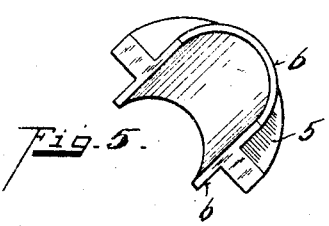
Witnesses
Inventor
Walter L. Bodman

UNITED STATES PATENT OFFICE.

WALTER L. BODMAN, OF COVINGTON, KENTUCKY.

WHEEL-JOURNAL.

975,744.

Specification of Letters Patent.   Patented Nov. 15, 1910.

Application filed June 7, 1909. Serial No. 500,701.

*To all whom it may concern:*

Be it known that I, WALTER L. BODMAN, a subject of the Kingdom of Great Britain, residing at Covington, in the county of Kenton and State of Kentucky, have invented certain new and useful Improvements in Wheel-Journals, of which the following is a specification.

The object of my invention is to provide a journal for wheel and axle with the parts so constructed as to practically eliminate friction from end thrusts of the wheel in either direction.

Another object of my invention is to obtain an oil tight box, so as to keep the parts thoroughly oiled and positively exclusive of dust.

Another object of my invention is to so construct the axle and box that the journal and its supports shall be maintained in a parallel position.

In the drawings, Figure 1 is an elevation of an axle with the axle-boxes thereon, showing one of the wheel hubs in dotted lines. Fig. 2 is an enlarged sectional elevation of the axle box on an axle shown in elevation. Fig. 3 is a section on line $x$, $x$, Fig. 2. Fig. 4 is a sectional elevation on line $w$, $w$, Fig. 2. Fig. 5 is a perspective view of one of the abutment parts.

1 represents the axle upon which the axle-box is mounted.

2 represents the axle box adapted to be driven into the hub of a wheel, having the internal screw threaded flange 3.

4 represents an annular groove in the axle.

5 represents a two-part abutment, each part having a semi-tubular base 6 fitting in the annular groove 4.

7 represents washers placed upon the axle, adjacent to the abutment 5, maintaining the two halves of the abutment in position upon the axles.

8 represents a ball retainer, carrying the balls 9, one set of balls are placed upon each side of the abutment 5 and contacting the washers 7.

In the preferred form shown in the drawings, the enlarged inner end of said axle box receives a sleeve nut 10, which has a flange 11 encircling the axle. It is preferably provided with two sets of threads, as shown in Fig. 2. one a right and the other a left handed thread, the smaller diameter of thread provided to receive a lock nut 13, so as to fix the sleeve and its contained parts in position.

14 represents a hardened steel washer placed adjacent to the heel end of the axle box against which one set of balls contact. and 15 represents a hardened steel washer against which the second set of balls contact upon the opposite side of the abutment 5, said washer bearing against the packing 16 placed between the washer 15 and flange 11 of the nut 10. The thrust receiving members are all loose upon the axle and free to revolve thereby, considerably lessening the friction during the rotation of the wheel.

The enlarged inner end of the axle box is a cylinder internally threaded to receive the externally threaded cylindrical nut 10; when the latter is in the position shown in Fig. 2, the parts 3, 10, form a two-part cylindrical housing and encompass the annular abutment and the anti-friction rings interposed between the respective ends of the cylindrical housing and the annular abutment.

It will be seen that each section of the two-part abutment is provided with sleeve extensions 6, and the length of said sleeve corresponds with the width of the annular groove 4 of the axle. This extended sleeve bearing serves the purpose of preventing undue wear of the abutment upon the axle, while a narrow rim-like abutment will wear much faster. This sleeve extension and annular abutment also furnishes a support for anti-friction rings which are likewise revoluble on the base of the abutment.

It will be observed that the annular abutment receives the lateral or end thrusts of the wheel in both directions, and that the anti-friction devices upon each side thereof materially lessen the friction, which would otherwise be engendered by such thrusts. I prefer to make this abutment revoluble on the axle and to make it in two parts, so that it can be readily applied in position. I do not intend to limit myself to this construction, except in so far as is specifically mentioned in the claims.

In order to make the wheel oil tight and thoroughly exclude dust, the outer end of the sleeve is closed, and the axle is shown as grooved, (see dotted lines, Fig. 2), and leading into a cavity 17 in the front end of the sleeve, so as to oil the entire length of the axle. The oil, of course, will easily work in between the washers and their abutting parts.

The construction herein shown and described is such as to maintain the parallelism of the axle and the axle-box and its parts. At the same time dust is effectively excluded and the lubrication of the revolving parts is maintained as long as there is oil in the reservoir.

The wheel is readily removed from the axle by unscrewing the lock nut which will permit the wheel to be turned backward, releasing the threaded sleeve from engagement with the sleeve nut 10. After the wheel is removed, the abutment 5 is readily removable together with the ball-bearing devices from the sleeve nut 10. It will be seen that the parts are readily put together and taken apart.

Having described my invention, I claim:—

1. A wheel journal, an axle provided with an elongated peripheral groove, a two-part annular abutment, having a flange extension upon each side thereof, adapted to seat within said annular groove, bearing rings telescopically engaged over said flanges upon each side of the abutment to maintain the same in position upon the axle, and a separable housing inclosing said abutment and ring and against which the same engages.

2. A wheel journal, an axle provided with an elongated peripheral groove, a two-part annular abutment, having a flange extension upon each side thereof, adapted to seat within said annular groove, bearing rings telescopically engaged over said flanges upon each side of the abutment to maintain the same in position upon the axle, a sleeve axle-box within which the axle journals provided with a cup-shaped end, a sleeve nut screw-threaded within said cup-shaped end, and anti-friction rings interposed between said abutment and axle-box, and abutment and nut.

3. A wheel journal, an axle provided with an elongated peripheral groove, a two-part annular abutment, having a flange extension upon each side thereof, adapted to seat within said annular groove, bearing rings telescopically engaged over said flanges upon each side of the abutment to maintain the same in position upon the axle, a sleeve axle-box within which the axle journals provided with a cup-shaped end, a cup-shaped nut encircling said axle and screw-threaded within said cup-shaped axle-box end, anti-friction rings interposed between said abutment and axle-box, and abutment and nut, and a packing interposed between the anti-friction rings and nut, substantially as and for the purpose specified.

In testimony whereof, I have hereunto set my hand.

WALTER L. BODMAN.

Witnesses:
 OLIVER B. KAISER,
 EMMA SPENER.